United States Patent
Wang et al.

(10) Patent No.: US 11,582,405 B1
(45) Date of Patent: Feb. 14, 2023

(54) IMAGE DATA PROCESSING USING NON-INTEGER RATIO TRANSFORMING FOR COLOR ARRAYS

(71) Applicant: QUALCOMM Incorporated, San Diego, CA (US)

(72) Inventors: Jing Wang, Milpitas, CA (US); Shang-Chih Chuang, San Diego, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/448,654

(22) Filed: Sep. 23, 2021

(51) Int. Cl.
*H04N 5/347* (2011.01)
*G06T 3/40* (2006.01)
*H04N 5/345* (2011.01)

(52) U.S. Cl.
CPC .......... *H04N 5/347* (2013.01); *G06T 3/4015* (2013.01); *H04N 5/3454* (2013.01)

(58) Field of Classification Search
CPC ..... H04N 5/347; H04N 5/3454; G06T 3/4015
See application file for complete search history.

(56) References Cited

U.S. PATENT DOCUMENTS

| | | | |
|---|---|---|---|
| 11,350,048 B1* | 5/2022 | Magnani | ................ H04N 5/347 |
| 2004/0165080 A1 | 8/2004 | Burks et al. | |
| 2011/0211756 A1 | 9/2011 | Linzer | |
| 2019/0005617 A1 | 1/2019 | Kunze | |
| 2021/0067749 A1* | 3/2021 | Yadav | .................... H04N 5/343 |

FOREIGN PATENT DOCUMENTS

| | | |
|---|---|---|
| DE | 102016112968 A1 | 1/2018 |
| TW | 201337833 A | 9/2013 |

* cited by examiner

*Primary Examiner* — Michael E Teitelbaum
(74) *Attorney, Agent, or Firm* — Qualcomm Incorporated

(57) ABSTRACT

A transformer may transform image data from a first color pattern to a second color pattern. The transforming of image data may be applied to image data received from a memory storing an array of intensities corresponding to a first color pattern of a first color filter array (CFA) of an image sensor to a second color pattern. The second color pattern may be a color pattern of a size smaller that the first CFA. Remosaicing may be applied to the second color pattern to obtain image data organized in a Bayer color pattern. The transforming may be configured to operate on data from an image sensor to obtain different zoom levels not available without applying a digital zoom algorithm that involve upscaling, which reduces the image quality of the image data.

26 Claims, 7 Drawing Sheets

IMAGE DATA PROCESSING USING NON-INTEGER RATIO TRANSFORMING FOR COLOR ARRAYS

TECHNICAL FIELD

Aspects of the present disclosure relate generally to image signal processing. Some features may enable and provide improved communications, including deblurring operations to compensate for blur introduced by large aperture sizes.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Digital representations of scenes can take the form of different arrangements of digital data. An image sensor includes hardware configured to obtain a plurality of light measurements. The light measurements may be made through a color filter array (CFA) that results in separate light measurements corresponding to measurements of intensities of different colors in the scene. For example, the color filter array on an image sensor may include a plurality a red filters, green filters, and blue filters, and the resulting output from the image sensor correspond to measurements of red, blue, and green colors at different locations in the scene. Although many different color arrangements and array sizes are possible for CFAs, the output of an image sensor with a CFA is often converted to a Bayer color pattern for further processing.

The manner of conversion to the Bayer color pattern can affect the representation of the scene, and particularly the apparent zoom on the scene. For example, when converting an N×N CFA to Bayer, remosaicing may be used to adjust a zoom level in the representation of the scene. As another example, when converting an N×N CFA to Bayer, a combination of binning and upscaling can be used to adjust a zoom level in the representation of the scene. However, these processing techniques of remosaicing, binning, and upscaling, operate to adjust the N×N CFA in integer intervals. For any initial N×N CFA there are integer zoom levels that cannot be obtained, which results in discontinuity in the available in-sensor zoom levels for an image sensor. For example, a 3×3 CFA can be binned to obtain a Bayer (1×1) pattern or output as a 3× zoom. To achieve 2× in-sensor zoom, the N×N CFA would have to be binned to obtain a Bayer (1×) pattern, and upscaling the binned-Bayer color pattern to 2× zoom or downscale a remosaic of the 3×3 CFA. Both of which are undesirable because without a direct processing from the original image to the desired in-sensor zoom, the additional processing generates a visible image quality change.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A first color pattern of a first configuration, such as an M×M color filter array (CFA), may be transformed into a second color pattern of a second configuration, such as an N×N color filter array (CFA). The transforming may allow non-integer ratios of M to N. In some embodiments the non-integer ratio transform may be used to provide zoom levels between the zoom levels available through remosaicing and binning. The transforming may be performed without upscaling, which allows the output of the transforming to avoid the image quality loss caused by upscaling. In some embodiments, a transformer may be reconfigurable to process input data from different image sensor configurations with different color filter arrays (CFAs). In some embodiments, a transformer may be configured to output image data in a color pattern corresponding to a fixed-function circuit that converts image data to a Bayer color pattern. For example, a fixed-function QCFA (2×2 CFA) demosaic block may be coupled to the transformer and the transformer configured to accept different M×M color patterns and transform to 2×2 CFA to match the fixed-function QCFA demosaic block. The transformer or other circuitry for performing the transforming of an M×M color pattern to an N×N color pattern may be included in an image sensor, such that the output of the image sensor is transformed from the color filter array present on the image sensor. The transformer or other circuitry may also or alternatively be included in an image signal processor and applied such that image data from the image sensor is transformed, in part or entirely, in the ISP.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor. The image processing techniques described in embodiments disclosed herein may be performed by circuitry in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor or corrected image frames processed by one or more algorithms within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations. In such examples, the image signal processor may be configured to produce a flow of output frames that may have improved appearance in low-light conditions.

In some aspects, the corrected image frame may be produced by combining aspects of the image correction of this disclosure with other computational photography techniques such as high dynamic range (HDR) photography or multi-frame noise reduction (MFNR). With HDR photography, the first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the image correction or otherwise controlling aspects of the image correction, such as by determining when to apply deblurring and applying a deblurring operation to a blurry object and controlling a zoom level of a resulting image. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embodied in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
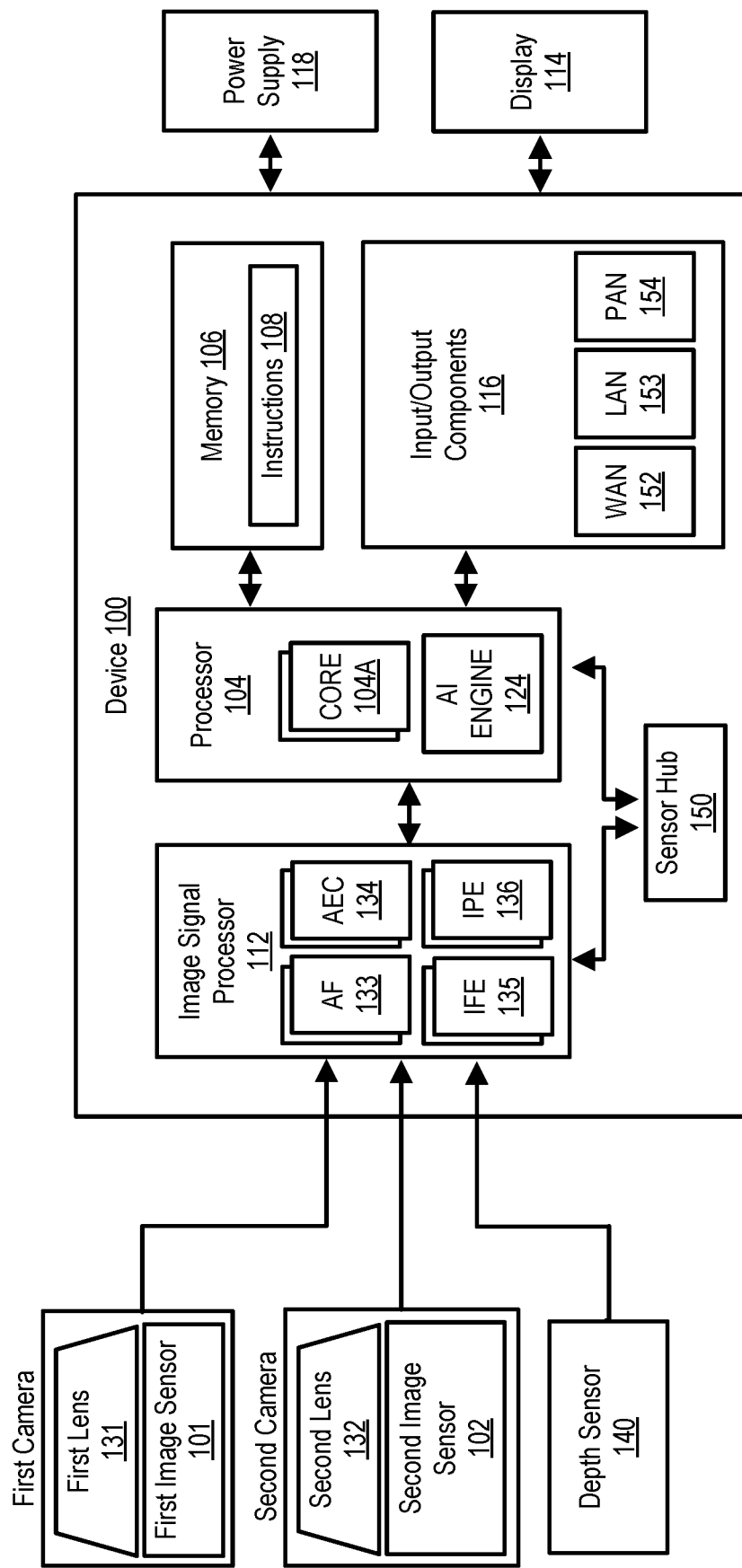
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that transform image data from a first color pattern to a second color pattern with little or no reduction in image quality of the resulting image frame. In some embodiments, the transforming of image data may be applied to image data received from a memory storing an array of intensities corresponding to a first color pattern of a first color filter array (CFA) of an image sensor to a second color pattern. The second color pattern may be a Bayer color pattern or another color pattern of a size smaller that the first CFA. In some embodiments in which the second color pattern is not a Bayer color pattern, remosaicing may be applied to the second color pattern to obtain image data organized in a Bayer color pattern. The transforming according to embodiments of this disclosure may be configured to operate on data from an image sensor to obtain different zoom levels not available without applying a digital zoom algorithm that involve upscaling, which reduces the image quality of the image data.

Particular implementations of the subject matter described in this disclosure may be implemented to realize one or more of the following potential advantages or benefits. In some aspects, the present disclosure provides techniques for image signal processing that provide for smooth zoom transitions by providing additional integer zoom levels that form sequential zoom levels when combined with binning and remosaicing operations.

For example, the combination of binning, transforming, and remosaicing on an image sensor with a 3×3 CFA can result in integer zoom levels at 1×, 2×, and 3× without using an upscaling algorithm, and texture and noise of the resulting image data can be optimized at different zoom levels and scene types by switching between the transforming, binning, and remosaicing. Further, the transforming from a first color pattern to a second color pattern of a non-integer size ratio allows the transformer to be reconfigurable to support image sensors with different CFA configurations without redesigning the image signal processing components.

In some embodiments, the transforming may be performed in the image sensor component that couples to a processor, image signal processor, or other data processing device. In such an embodiment, the processing in components downstream of the image sensor may be reduced. For example, the image sensors with different light sensing configurations and output array sizes may be configured to output an image data format different from that of the image sensor configuration, and in some embodiments provide zoom levels without upscaling or other operations that decrease the image quality. Particular implementations of such an embodiment may improve support for the image sensor to be used with data processing devices of different configurations. For example, the image sensor may be configured for use with different data processing systems of mobile devices of different manufacturers.

In some embodiments, the transforming may be performed in the data processing device downstream of the image sensor. In such an embodiment, the data processing device may be able to couple to image sensors of different configurations by supporting different input data formats and array sizes, and in some embodiments provide zoom levels without upscaling or other operations that decrease the image quality. Particular implementations of such an embodiment may improve support for the data processing device to switch between multiple image sensors (e.g., wide, ultrawide, telephoto, etc.) of different configurations. For example, the data processing device may be configured for use with different image sensors of mobile devices of different manufacturers.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image post-processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. An image sensor, such as image sensors 101 and 102, may include an array of elements configured to measure an intensity of light that passes through a color filter to measure separate intensity values for different colors at different locations. The intensities read-out from the array of elements may be image data organized according to the configuration of the color filter and may be organized, for example, according to a 3×3 or 4×4 color filter array (CFA) of separate red, green, and blue values. The image sensor may include a memory to store this read-out data and an interface, such as to a bus coupled to the ISP 112, to transfer the read-out data. In some embodiments, the image sensor may include processing circuitry for processing the read-out data prior to transfer to another component of the device 100 for further processing, storage, or display. For example, the image sensor may include binning blocks, remosaicing blocks, and/or transformer blocks. In some embodiments, these blocks are fixed-function circuitry. In some embodiments, these blocks are processing logic for executing instructions that perform the algorithms of binning, remosaicing, and/or transforming.

In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical button interface. I/O components 116 may also include network interfaces for communicating with other devices, including a wide area network (WAN) adaptor 152, a local area network (LAN) adaptor 153, and/or a personal area network (PAN) adaptor 154. Examples of WAN adaptor 152 include a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna and may be coupled to multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, one or more transceivers and a baseband processor may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver. The data from sensor hub 150 may be used by the image signal processor 112 for generating corrected image frames, such as by applying electronic image stabilization (EIS) and/or digital image stabilization (DIS).

The image signal processor 112 may receive image data from one or more cameras in the form of image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

A first camera may include the first image sensor 101 and a corresponding first lens 131. A second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane corresponding to a certain focus position. The AF algorithm 133 may be assisted by depth sensor 140 by using depth data to approximate a focus position.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view.

The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102 to generate corrected image frames based on an image frame captured by the depth sensor 140. The depth sensor 140 may also be used to apply a correction to a first image frame captured from one of the image sensors 101 and 102, such as by using the depth data to segment an image frame from the sensors 101 or 102 into a foreground and background region and separately processing the foreground and background regions when determining a corrected first image frame. Although the apparatus shown in FIG. 1 may reflect a configuration for some embodiments of the disclosed image signal processing techniques and methods, any number of additional image sensors or image signal processors may be included in other embodiments of the device 100 while still implementing aspects of the disclosed image signal processing techniques and methods.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), one or more automatic exposure control (AEC) 134 engines, and/or one or more autofocus (AF) 133 engines. The AF 133, AEC 134, IFE 135, IPE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including reconfiguring processing paths and/or transformer elements. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
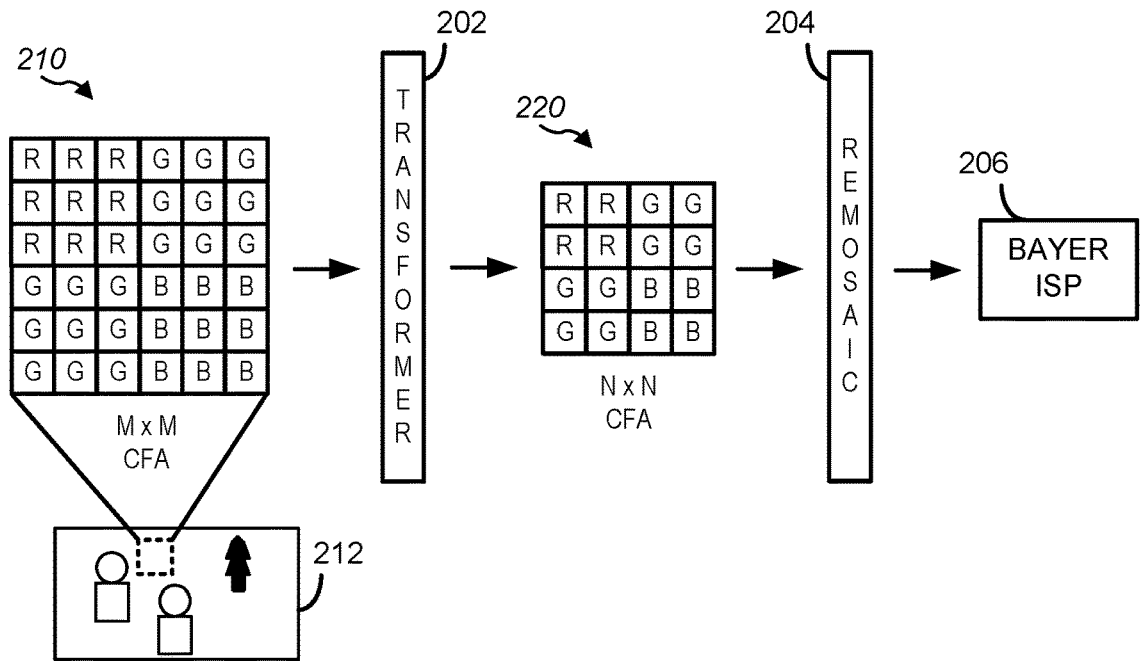
FIG. 2 is a block diagram illustrating operation of a transformer according to one or more embodiments of the disclosure.

FIG. 2 is a block diagram illustrating operation of a transformer according to one or more embodiments of the disclosure. A transformer 202 may receive first image data 210 organized in a first color pattern, such as a M×M color filter array (CFA), where M is an integer value greater than one. The first image data 210 may be part of an image frame 212 depicting a first representation of a scene. An image sensor of an image capture device may capture the scene as a series of intensity values corresponding to red, blue, and green (RGB) values, although other color representations may alternatively be used. One example of an M×M CFA is a pattern of 3×3 red pixels in a top-left quadrant of a 6×6 array, 3×3 green pixels in a top-right quadrant of the 6×6 array, 3×3 green pixels in a bottom-left quadrant of the 6×6 array, and 3×3 blue pixels in a bottom-right quadrant of the 6×6 array. This 6×6 array is repeated many times with different values to form the image frame 212.

The image data 210 may be transformed by the transformer 202 into second image data 220 of a different color pattern, such as a smaller CFA of size N×N, where N is an integer value smaller than M. The image data 220 may also be part of an image frame that is a second representation of the scene captured by image frame 212. One example of an N×N CFA is a pattern of 2×2 red pixels in a top-left quadrant of a 4×4 array, 2×2 green pixels in a top-right quadrant of the 4×4 array, 2×2 green pixels in a bottom-left quadrant of the 4×4 array, and 2×2 blue pixels in a bottom-right quadrant of the 4×4 array. The transformer 202 may apply an algorithm for producing the values for the image data 220 from the image data 210 by using, for example, a weighed sum of neighboring pixels with weightings based on distance between a source value in the image data 210 to a destination value in the image data 220 and an intensity of the source value in the image data 210. One example algorithm for the transformer 202 is described with reference to FIG. 4. The processing of FIG. 2 is performed without digital upscaling of image data, which improves the image quality of the output image frame.

Although the output of the transformer 202 may be a non-integer ratio of the input of the transformer 202, the output may be different from a Bayer color pattern, or other color pattern, desired for an output image frame. Further processing of the image data 220 may be performed in remosaic block 204 to convert the N×N CFA of image data 220 to a Bayer color pattern 206. In some embodiments, the transformer 202 and remosaic block 204 may be integrated with the image sensor, such that the output of the image sensor is a Bayer color pattern representation of the scene in image frame 212. The Bayer color pattern image data 206 is then transferred to an ISP over a data bus. This may provide the benefit of lower power consumption through reducing the amount of data transfer over the bus from the image sensor to the ISP. Another benefit may be that of reducing a number of data bus channels between the image sensor and the ISP.

In some embodiments, the transformer 202 and remosaic block 204 may be integrated with the ISP, such that the output of the image sensor is a M×M CFA and the ISP receives the M×M CFA for processing through the transformer 202 and remosaic block 204 to obtain Bayer color pattern image data for encoding in an image file, such as a JPEG or HEIF image file, or for display to a user as part of a camera preview. In still other embodiments, the transformer 202 may be integrated with the image sensor and the remosaic block 204 integrated with the ISP. Additional processing blocks may also be present in the image sensor and/or ISP.

The transformer 202 may be a hardware circuit block in either the image sensor and/or the ISP. For example, transformer 202 may be a reconfigurable instruction cell array (RICA). As another example, transformer 202 may be a companionship circuit, such as one or more auxiliary hardware elements used to supplement the AP or ISP. The transformer 202 may be a software block implemented as instructions executed by an AP, DSP, or other programmable logic circuit.

Figure 3:
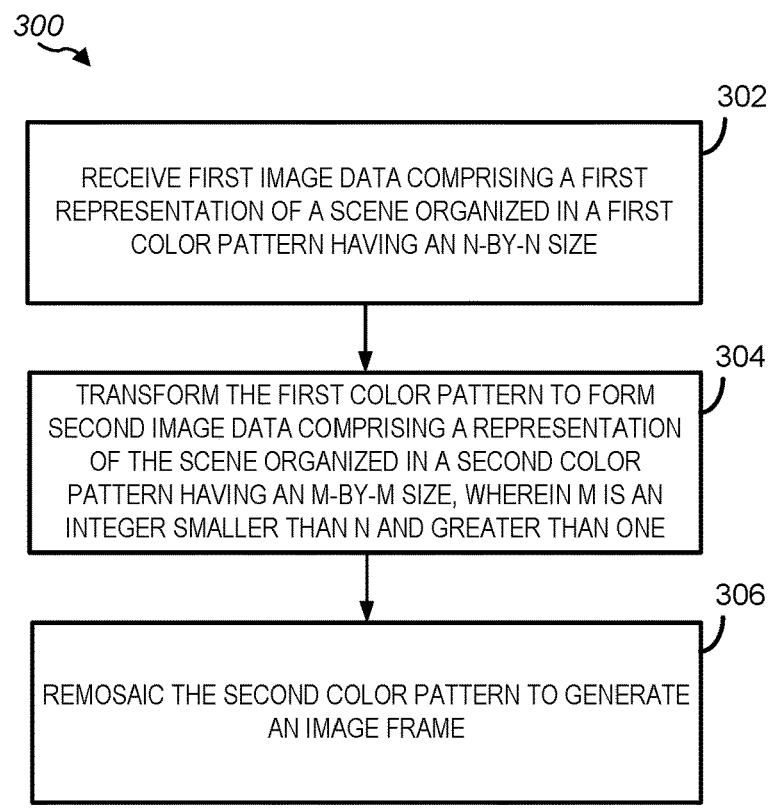
FIG. 3 is a flow chart illustrating a method of transforming image data according to one or more embodiments of the disclosure.

A method of processing image data by transforming the image data is shown in FIG. 3. FIG. 3 is a flow chart illustrating a method of transforming image data according to one or more embodiments of the disclosure. A method 300 includes, at block 302, receiving first image data comprising a first representation of a scene organized in digital data of a first color pattern having an N×N size. For example, the first image data 210 in a 3×3 CFA may be received by transformer 202. At block 304, the first color pattern is transformed to form second image data comprising a representation of the scene organized in a second color pattern having an M×M size, wherein M is an integer smaller than N (in the N×N size of block 302), and wherein M may be greater than 1. For example, the first image data 210 in a 3×3 CFA may be transformed to second image data 220 in a 2×2 CFA. At block 306, remosaicing is applied to the second color patter to generate an output image frame. For example, the second image data 220 in a 2×2 CFA is processed with remosaicing to obtain a Bayer color pattern 1×1 CFA. Although some examples describe processing to obtain a Bayer color pattern, the processing may be performed to obtain other color patterns such as RGBE, RYYB, CYYM, CYGM, RGBW Bayer, RGBW #1, RGBW #2, RGBW #3, X-Trans, Quad Bayer, RYYB Quad Bayer, Nonacell, RCCC, or RCCB.

Figure 4:
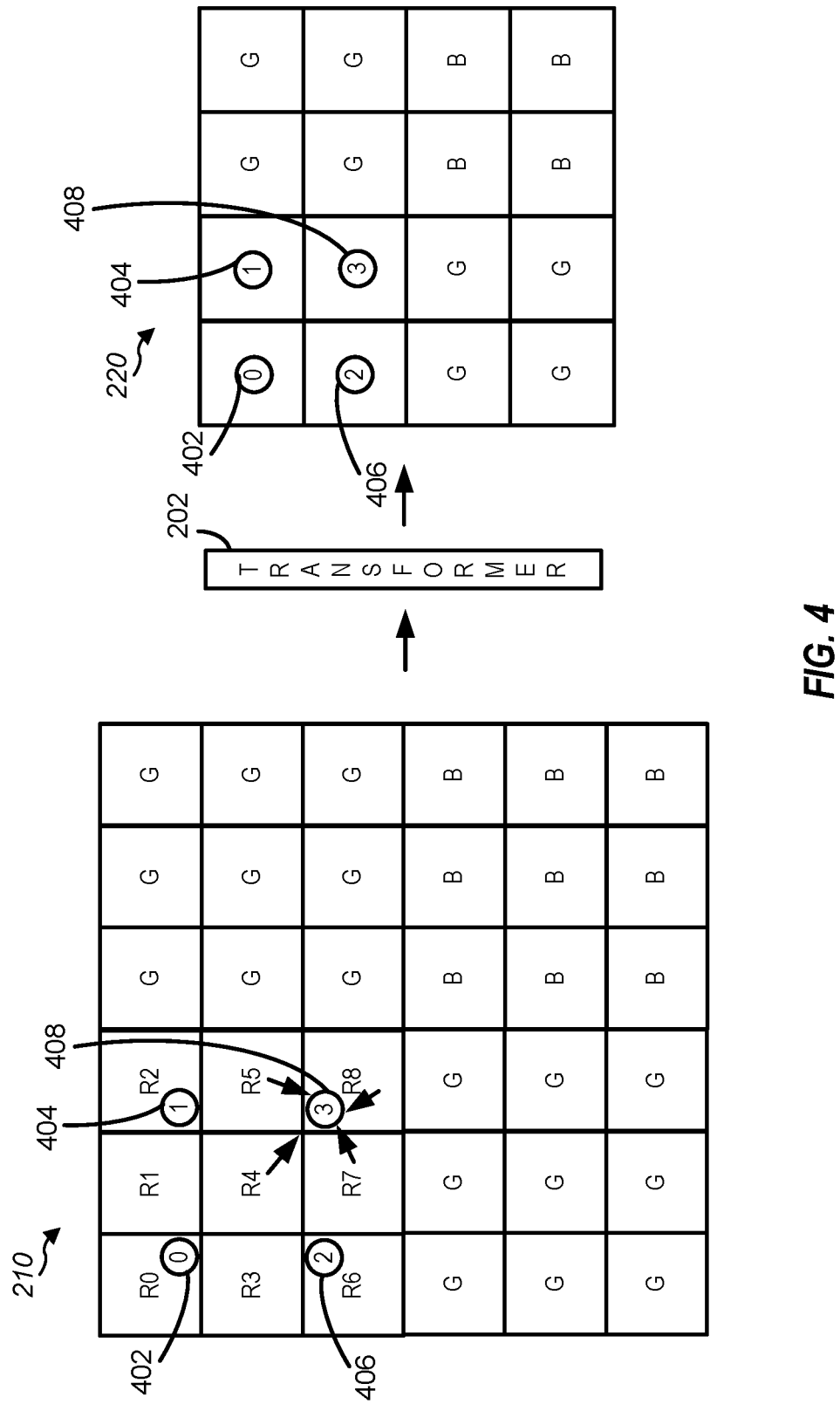
FIG. 4 is a block diagram illustrating an example transformation of a 3×3 color pattern to a 2×2 color pattern.

An example algorithm for transforming a color pattern to another color pattern of a non-integer ratio is illustrated in FIG. 4. FIG. 4 is a block diagram illustrating an example transformation of a 3×3 color pattern to a 2×2 color pattern. The image data 210 may be processed by transformer 202 to obtain second image data 220. The first image data 210 may include pixels R0-R8, corresponding to red values of image data, in a top-left quadrant of the 3×3 CFA. The nine pixels of R0-R8 may be mapped into a 2×2 array of values 402, 404, 406, and 408. The transformation may be performed by, for example, determining pixel value 402 in image data 220 from neighboring pixels R0, R1, R3, and R4. Pixel value 404 may likewise be determined from neighboring pixels R1, R2, R4, and R5. Pixel value 406 may likewise be determined from neighboring pixels R3, R4, R6, and R7. Pixel value 308 may likewise be determined from neighboring pixels R4, R5, R7, and R8. Similar transforming may be performed to transform the 3×3 green pixel values in image data 210 to the 2×2 green pixel values in image data 220 and to transform the 3×3 blue pixel values in image data 210 to the 2×2 blue pixel values in image data 220. More generally, each set of M×M values in second image data 220 may be derived from the same respective color of N×N values in first image data 210. In some embodiments, the pixel values 402, 404, 406, and 408 are spaced equally apart, which may avoid phase shift in the transformed image data.

One example algorithm for determining pixel values in the transforming includes determining each value of a first plurality of values (OUT(i,j)) in the second image data 220 by determining:

$$OUT(i, j) = \frac{\sum_{k,l} IN(k, l) w(i, j, k, l)}{\sum_{k,l} w(i, j, k, l)},$$

wherein:
IN(k,l) is one of the second plurality of values of the corresponding first color pattern in the first image data 210, and
w(i,j,k,l) is a weight value computed based on:

$$w(i, j, k, l) = \exp\left(-\frac{(i \times S - k)^2 + (j \times S - l)^2}{2\sigma_s^2} - \frac{\|IN(i \times S, j \times S) - I\|}{2\sigma_d^2}\right)$$

wherein S is a value based on N and M, and
wherein $\sigma_s$ and $\sigma_d$ are smoothing parameters corresponding to spatial weight smoothing and differential weight smoothing, with bigger values corresponding to more smoothing.

Figure 5:
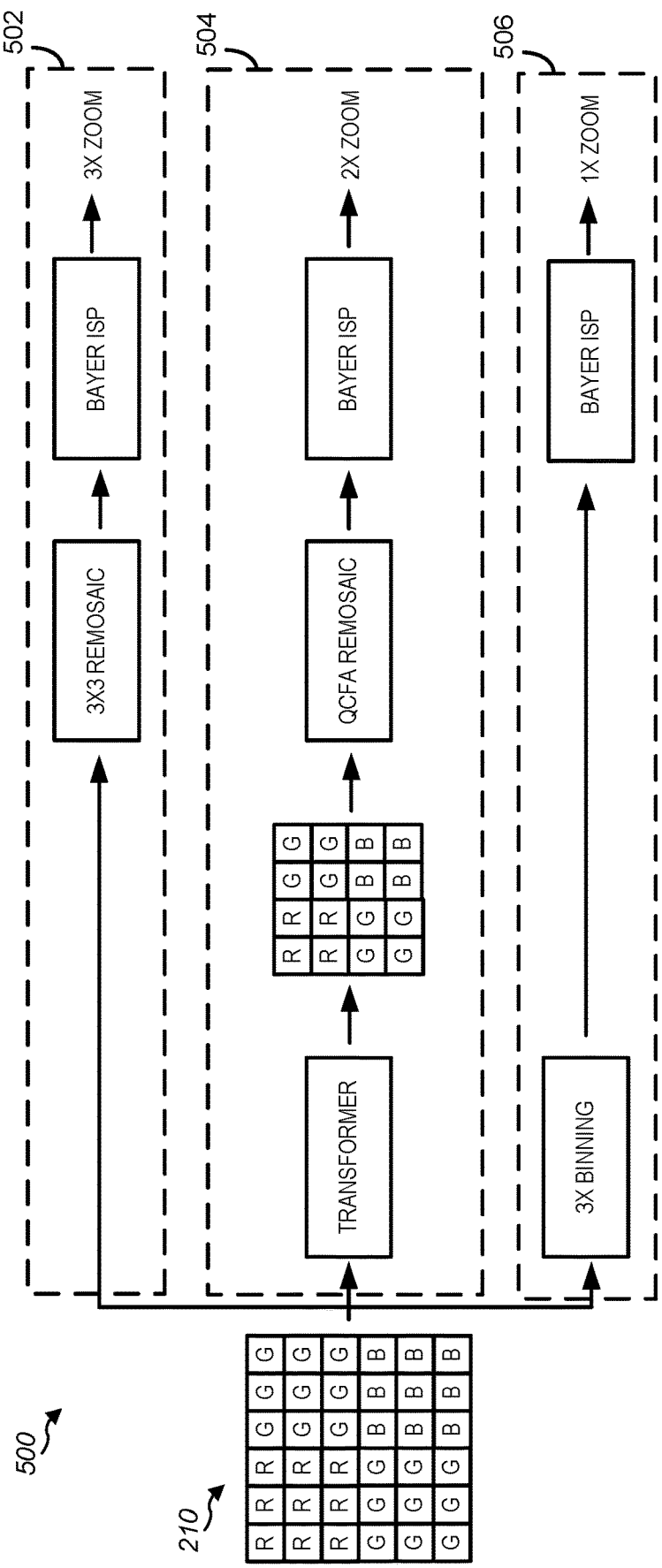
FIG. 5 is a block diagram illustrating example processing paths for obtaining sequential zoom levels from an image sensor with a 3×3 color pattern.

The arbitrary transform of image data between different color patterns of different sizes may allow obtaining sequential integer zoom levels from an image sensor without upscaling that reduces image quality at some zoom levels. In some embodiments having the transformer integrated with the image sensor, the sequential zoom levels may be obtained for in-sensor zoom levels. FIG. 5 is a block diagram illustrating example processing paths for obtaining sequential zoom levels from an image sensor with a 3×3 color pattern.

As shown in the processing flow 500 for first image data 210 of a first pattern of a 3×3 CFA, the 3×3 CFA may be processed in one of the processing paths 502, 504, or 506 to obtain a Bayer color pattern output image frame at one of several sequential zoom levels. A first processing path 502 may remosaic the 3×3 CFA color pattern to obtain a Bayer color pattern representation of the scene in image data 210 at a 3× zoom level. A second processing path 504 may transform the 3×3 CFA color pattern to obtain a 2×2 CFA color pattern, in which two is a non-integer ratio from three, and QCFA remosaicing applied to that 2×2 CFA, also referred to as a quad CFA (QCFA), to obtain a Bayer color pattern output image frame at a λ× zoom level. A third processing path 506 may transform the 3×3 CFA color pattern to obtain a Bayer color pattern output image frame through 3× binning.

Switching between processing paths 502, 504, and 506 may be determined by a user input to a camera application executing on the image capture device. For example, a user may input a pinch in or pinch out gesture on a touch screen or input a swipe up or swipe down gesture or input a up button or bottom button to increase or decrease a zoom level. Referring to FIG. 1, the user's input may be processed in the application processor 104 to send a command to the ISP 112 to change the output image frame characteristics, and the ISP 112 may send a command to a currently-active image sensor, such as one or both of image sensors 101 and 102, to change processing between processing paths 502, 504, and 506.

Figure 6:
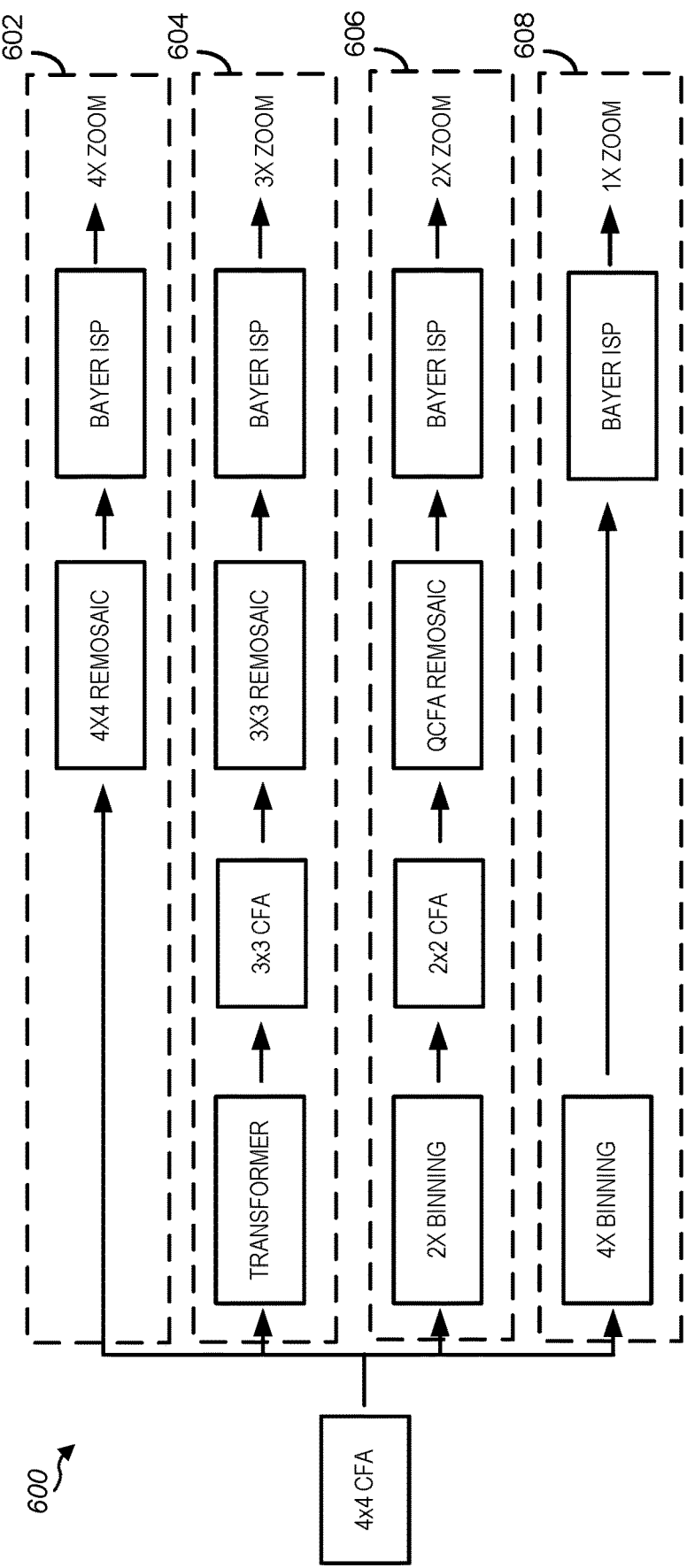
FIG. 6 is a block diagram illustrating example processing paths for obtaining sequential zoom levels from an image sensor with a 4×4 color pattern.

Another example of processing paths is shown in FIG. 6 for processing image sensor data with 4×4 CFA pattern. FIG. 6 is a block diagram illustrating example processing paths for obtaining sequential zoom levels from an image sensor with a 4×4 color pattern. As shown in the processing flow 600 for image data 210 of a first pattern of a 4×4 CFA, the 4×4 CFA may be processed in one of the processing paths 602, 604, 606, or 608 to obtain a Bayer color pattern output image frame at one of several sequential zoom levels. A first processing path 602 may remosaic the 4×4 CFA color pattern to obtain a Bayer color pattern representation of the scene in image data 210 at a 4× zoom level. A second processing path 604 may transform the 4×4 CFA color pattern to obtain a 3×3 CFA color pattern, followed by remosaicing to obtain a Bayer color pattern output image frame at a 3× zoom level. A third processing path 606 includes 2× binning of the 4×4 CFA color pattern followed by remosaicing to obtain a Bayer color pattern output image frame at a 2× zoom level. A fourth processing path 608 includes 4× binning of the 4×4 CFA color pattern to obtain a Bayer color pattern output image frame at 1× zoom level.

Switching between processing paths 602, 604, 606, and 608 may be determined by a user input to a camera application executing on the image capture device. Other events may trigger the change in processing paths and corresponding zoom level. For example, tracking may be performed on a detected object in the scene that leaves a region of the scene captured at a particular zoom level triggering a change to a lower zoom level. The operation of switching between zoom levels is described in FIG. 7.

Figure 7:
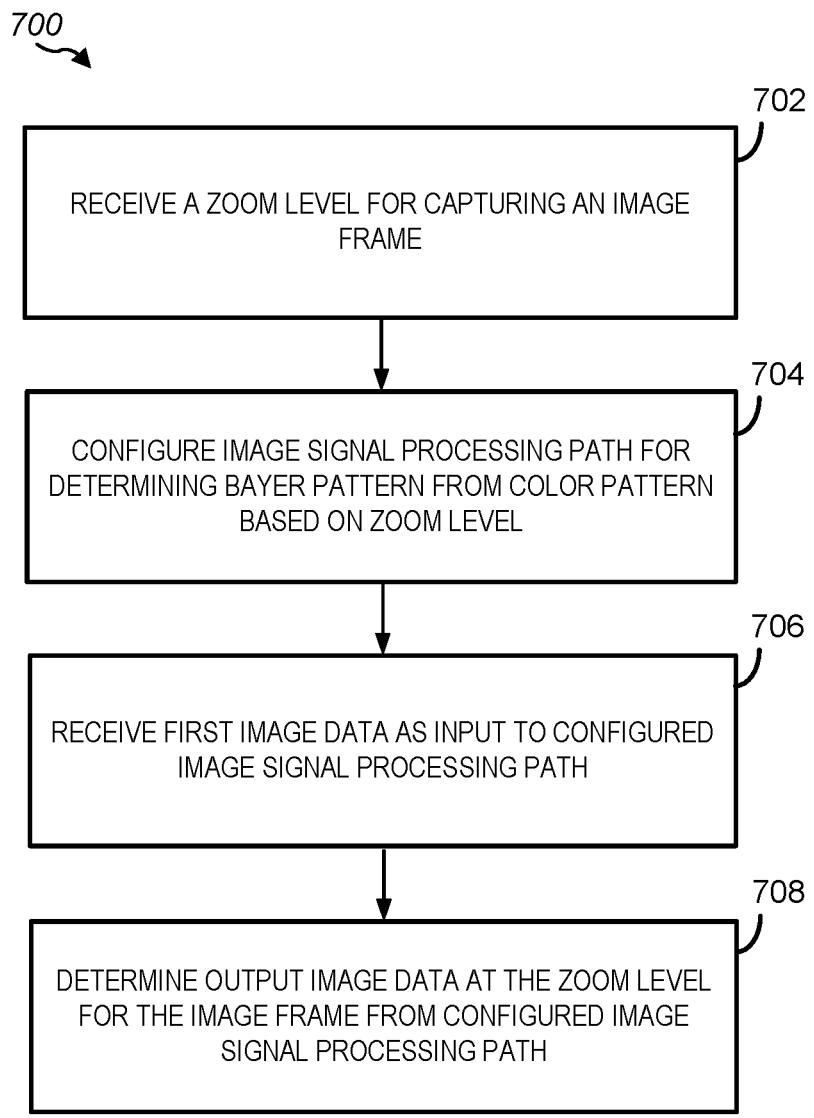
FIG. 7 is a flow chart illustrating a method of processing image data to obtain different zoom levels according to one or more embodiments of the disclosure.

FIG. 7 is a flow chart illustrating a method of processing image data to obtain different zoom levels according to one or more embodiments of the disclosure. A method 700 includes, at block 702, receiving a zoom level for capturing an image frame. The zoom level may be received through user input or determined based on an algorithm processing the image data. At block 704, the image signal processing path is configured for determining a Bayer color pattern from the color pattern based on the received zoom level. For example, the AP may issue a command to the ISP and/or the ISP may issue a command to the image sensor to reconfigure between processing paths 502, 504, and 506 or between processing paths 602, 604, 606, and 608. After reconfiguring the image sensor and/or ISP, first image data is received as input at block 706 to the processing path. At block 708, the processing path processes the first image data to obtain an output frame at the zoom level corresponding to the configured processing path.

Figure 8:
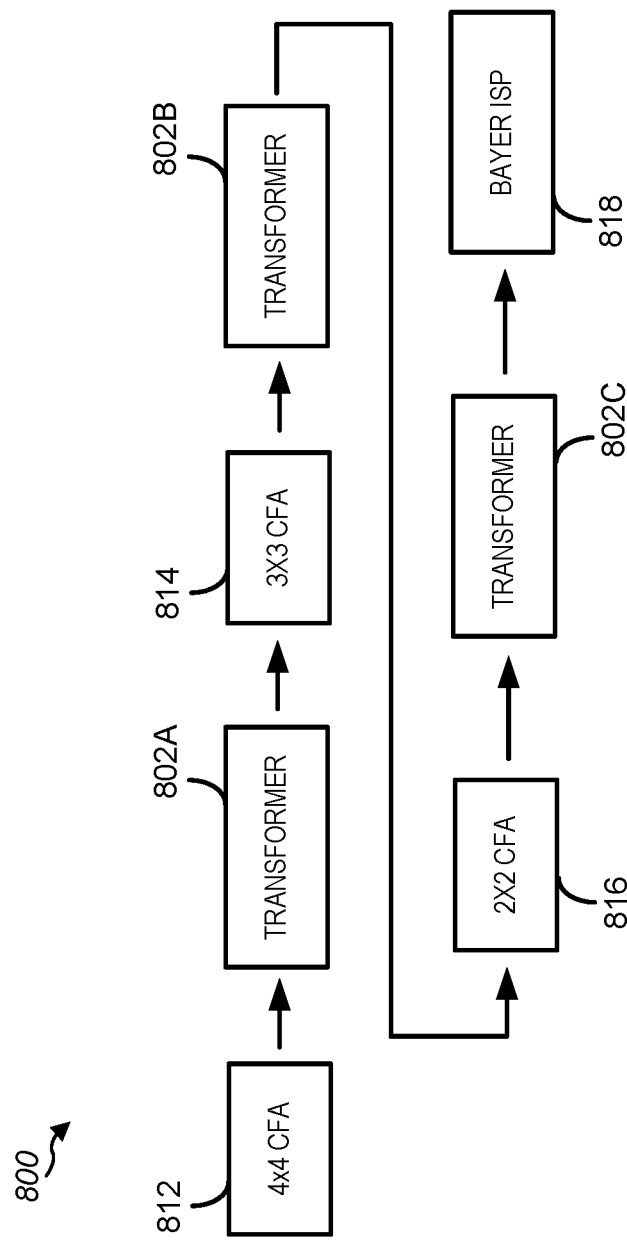
FIG. 8 is a block diagram illustrating a sequential application of a transform according to one or more embodiments of the disclosure.

Combinations of a transformer with other image signal processing, such as binning and remosaicing, to obtain a Bayer color pattern image frame is described in embodiments above. The flexibility of the transformer as a result of the non-integer ratio transforming allows the transformer to be configured in additional configurations. For example, transformers may be coupled in series in a processing path to transform an input image data of a first color pattern to Bayer color pattern output image data. FIG. 8 is one example of sequential transforming. FIG. 8 is a block diagram illustrating a sequential application of a transform according to one or more embodiments of the disclosure. A processing path 800 includes transformers 802A, 802B, 802C. Transformer 802A receives image data 812 with a M×M color pattern, such as a 4×4 CFA. The transformers 802A-C sequentially step the color pattern down to a 1×1 Bayer color pattern. For example, each transformer 802A-C reduces the color pattern size by one such that transformer 802A transforms image data 812 to image data 814 with a (M−1)×(M−1), or 3×3, CFA array, transformer 802B transforms image data 814 to image data 816 with a (M−2)×(M−2), or 2×2 CFA array, and transformer 802C transforms image data 816 to image data 818 with a Bayer color pattern. Although an example of three transformers 802A-C is shown for transforming a 4×4 CFA array, other number of transformers may be used. For example, two transformers may transforms a 4×4 CFA array to 2×2 CFA array and then to a Bayer color pattern. In some embodiments, the transformers 802A-C may correspond to a single instance of transformer processing logic, and feedback loop coupled around the transformer processing logic to use the same transformer for each of the transforms.

The arbitrary transforming of color patterns provides several benefits in generating image frames. First, the transformer adds more zoom ratios in between of traditional N×N CFA use cases. Second, the transformer provides more flexibility to balance the texture and noise for a given lighting condition. For example, a given N×N CFA, (N−1)×(N−1) CFA has better details then (N−2)×(N−2) CFA. As another example, a given N×N CFA, (N−1)×(N−1) CFA has worse noise then (N−2)×(N−2) CFA. As a further example, the availability of the transforming of embodiments of this disclosure may allow switching between data processing techniques such as upscaling, transforming, and downscaling to obtain the desired zoom level. Table 1 illustrates the image quality benefits of various image data processing techniques, demonstrating that transforming offers an image quality that may be preferable in at least certain circumstances to other data processing techniques when achieving an image frame with a desired zoom level.

| Image Data Processing | Image Quality Results |
| --- | --- |
| Upscaling | Worse texture, better noise |
| Transforming | Good texture, good noise |
| Downscaling | Better texture, worse noise |

Third, the image quality transition from different zoom ratios is smoother through the sequential zoom levels. Fourth, the transformer provides a technique for converting one color pattern to another color pattern, whereas remosaicing outputs only a Bayer color pattern.

In one or more aspects, techniques for supporting image signal processing may include additional aspects, such as any single aspect or any combination of aspects described below or in connection with one or more other processes or devices described elsewhere herein. In a first aspect, supporting image signal processing may include an apparatus configured to perform steps comprising receiving first image data comprising a first representation of a scene organized in a first color pattern having an N by N size, wherein N is an integer; transforming the first image data to form second image data comprising a second representation of the scene organized in a second color pattern having an M by M size, wherein M is an integer smaller than N and greater than one; and/or remosaicing the second image data to generate an output image frame comprising a third representation of the scene organized in a Bayer color pattern. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

In one or more aspects, techniques for processing image data may include additional aspects, such as any single aspect or any combination of aspects described below or in connection with one or more other processes or devices described elsewhere herein. In one or more aspects, supporting image processing may include an apparatus with a processor (e.g., a component of an image sensor, an image signal processor, a general purpose processor, and/or a graphics processing unit), along with a memory coupled to the processor, wherein the memory includes code that when executed by the processor causes the processor to perform steps comprising receiving first image data comprising a first representation of a scene organized in a first color pattern having an M by M size, wherein N is an integer; transforming the first image data to form second image data comprising a second representation of the scene organized in a second color pattern having an N by N size, wherein N is an integer smaller than M and greater than one; and/or remosaicing the second image data to generate an output image frame comprising a third representation of the scene. The third representation may be organized in a Bayer color pattern or another color pattern.

Additionally, the apparatus may perform or operate according to one or more aspects as described below. The processor may be configured to perform operations described herein with respect to the apparatus, such as described in FIGS. 2-8. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a first aspect, the device is further configured to perform steps of receiving a zoom level for capturing the first image data; when the zoom level is a first zoom level, performing the transforming the first image data and the remosaicing the second image data to generate the output image frame at the first zoom level; when the zoom level is a second zoom level, remosaicing the first image data to generate the output image frame at the second zoom level; and/or when the zoom level is a third zoom level, binning the first image data to generate the output image frame at the third zoom level.

In a second aspect, alone or in combination with the first aspect, the first zoom level, the second zoom level, and the third zoom level correspond to sequential integer zoom levels.

In a third aspect, alone or in combination with one or more of the first aspect or the second aspect, transforming the first image data to form second image data comprises determining a first plurality of values in the second color pattern based on a second plurality of values in a corresponding first color pattern by weighting each of the second plurality of values on an intensity of one of the second plurality of values and a distance of the one of the second plurality of values to a corresponding one of the first plurality of values.

In a fourth aspect, alone or in combination with one or more of the first aspect through the third aspect, determining each value of the first plurality of values (OUT(i,j)) in the second color pattern comprises determining $$OUT(i, j) = \frac{\sum_{k,l} IN(k, l) w(i, j, k, l)}{\sum_{k,l} w(i, j, k, l)},$$

wherein:
IN(k,l) is one of the second plurality of values of the corresponding first color pattern, and
w(i,j,k,l) is a weight value computed based on:

$$w(i, j, k, l) = \exp\left(-\frac{(i \times S - k)^2 + (j \times S - l)^2}{2\sigma_s^2} - \frac{\|IN(i \times S, j \times S) - I\|}{2\sigma_d^2}\right)$$

wherein S is a value based on N and M (e.g., a ratio between the size of the first pattern N and the size of the second pattern M).

In a fifth aspect, alone or in combination with one or more of the first aspect through the fourth aspect, determining the second image data comprises determining second image data organized in a second color pattern having a 2-by-2 size corresponding to a quadra color filter array (QCFA) pattern.

In a sixth aspect, alone or in combination with one or more of the first aspect through the fifth aspect, remosaicing the second image data to generate the output image frame is performed by a fixed function circuit configured for remosaicing a QCFA pattern to a Bayer color pattern.

In a seventh aspect, alone or in combination with one or more of the first aspect through the sixth aspect, transforming the first image data to form second image data is performed by a circuit configured to receive a first frame in a plurality of sizes of integers N corresponding to different image sensor configurations.

In an eighth aspect, alone or in combination with one or more of the first aspect through the seventh aspect, transforming the first image data to form second image data comprises sequentially transforming the first color pattern into smaller color patterns by transforming the first color pattern having an M×M size to an intermediate color pattern having a L×L size, wherein L is an integer value smaller than M; and transforming the intermediate color pattern having an L×L size to the second color pattern having a N×N size, wherein N is an integer value smaller than L.

In a ninth aspect, alone or in combination with one or more of the first aspect through the eighth aspect, the processor may be configured to perform steps of receiving a zoom level for capturing the first image data; when the zoom level is a first zoom level, performing the transforming the first image data and the remosaicing the second image data to generate the output image frame at the first zoom level; when the zoom level is a second zoom level, remosaicing the first image data to generate the output image frame at the second zoom level; and when the zoom level is a third zoom level, binning the first image data to generate the output image frame at the third zoom level.

In a tenth aspect, alone or in combination with one or more of the first aspect through the ninth aspect, the processor may be configured to perform steps for transforming the first image data to form second image data by deriving the second image data for each color respectively from the first image data for that color.

In an eleventh aspect, alone or in combination with one or more of the first aspect through the tenth aspect, the color pattern of the first image data comprises N by N values for each pixel of each color and the second image data comprises M by M values for each pixel of each color.

In a twelfth aspect, alone or in combination with one or more of the first aspect through the eleventh aspect, transforming the first image data to form second image data comprises sequentially transforming the first color pattern into smaller color patterns by transforming the first image data having an M×M size to intermediate image data having a L×L size, wherein L is an integer value smaller than M.

In a thirteenth aspect, alone or in combination with one or more of the first aspect through the twelfth aspect, a ratio of M to N is non-integer.

In a fourteenth aspect, alone or in combination with one or more of the first aspect through the thirteenth aspect, the transforming the first image data and the remosaicing the second image data to generate the output image frame can be performed at one or more zoom levels, wherein the method further comprises receiving a zoom level for capturing the first image data; and performing the transforming the first image data and the remosaicing the second image data to generate the output image frame at the received zoom level.

In some aspects of a device implementing one or a combination of the first aspect through the fourteenth aspect or other aspects described herein, the device may be an image sensor having a memory configured to store first image data comprising intensity values as a first representation of a scene organized in a first color filter array (CFA) having an M by M size, wherein M is an integer; a transformer coupled to the memory for transforming the first image data to form second image data comprising a second representation of the scene organized in a second color pattern having an N by N size, wherein N is an integer smaller than M and greater than one; and/or a remosaic block coupled to the transformer for remosaicing the second image data to generate an output image frame comprising a third representation of the scene organized in a Bayer color pattern. The image sensor may be included in an image capture device such as a stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In some aspects of such an image sensor, the transformer and the remosaic block are configured to generate the output image frame at a first zoom level, the remosaic block is coupled to the memory and further configured to generate the output image frame at a second zoom level, and the device further comprising a binning block coupled to the memory for binning the first image data to generate the output image frame at a third zoom level Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   receiving first image data captured at a zoom level, the first image data comprising a first representation of a scene organized in a first color pattern having an N by N size, wherein N is an integer;
   when the zoom level is a first zoom level:
      transforming the first image data to form second image data comprising a second representation of the scene organized in a second color pattern having an M by M size, wherein M is an integer smaller than N and greater than one; and
      remosaicing the second image data to generate an output image frame comprising a third representation of the scene;
   when the zoom level is a second zoom level, remosaicing the first image data to generate the output image frame at the second zoom level; and
   when the zoom level is a third zoom level, binning the first image data to generate the output image frame at the third zoom level.

2. The method of claim 1, wherein the first zoom level, the second zoom level, and the third zoom level correspond to sequential integer zoom levels.

3. The method of claim 1, wherein transforming the first image data to form second image data comprises determining a first plurality of values in the second color pattern based on a second plurality of values in a corresponding first color pattern by weighting each of the second plurality of values based on an intensity of one of the second plurality of values and a distance of the one of the second plurality of values to a corresponding one of the first plurality of values.

4. The method of claim 1, wherein the transforming the first image data and the remosaicing the second image data to generate the output image frame can be performed at one or more zoom levels,
   the method further comprising:
      receiving a zoom level for capturing the first image data; and
      performing the transforming the first image data and the remosaicing the second image data to generate the output image frame at the received zoom level.

5. The method of claim 1, wherein determining the second image data comprises determining second image data organized in a second color pattern having a 2-by-2 size corresponding to a quadra color filter array (QCFA) pattern.

6. The method of claim 5, wherein the remosaicing the second image data to generate the output image frame is performed by a fixed function circuit configured for remosaicing a QCFA pattern to a Bayer color pattern.

7. The method of claim 1, wherein a ratio of M to N is non-integer.

8. The method of claim 1, wherein transforming the first image data to form second image data comprises sequentially transforming the first color pattern into smaller color patterns by:
   transforming the first image data having an N×N size to intermediate image data having a L×L size, wherein L is an integer value smaller than N; and
   transforming the intermediate image data having an L×L size to the second image data having a M×M size, wherein M is an integer value smaller than L.

9. The method of claim 1, wherein the transforming the first image data to form second image data and the remosaicing the second image data to generate an output image frame is performed in an image sensor configured to output the output image frame to an image signal processor.

10. A device, comprising:
    a processor; and
    a memory coupled to the processor and storing instruction that, when executed by the processor, cause the device to perform operations comprising:
       receiving first image data captured at a zoom level, the first image data comprising a first representation of a scene organized in a first color pattern having an N by N size, wherein M is an integer;

when the zoom level is a first zoom level:
  transforming the first image data to form second image data comprising a second representation of the scene organized in a second color pattern having an M by M size, wherein M is an integer smaller than N and greater than one; and
  remosaicing the second image data to generate an output image frame comprising a third representation of the scene organized in a Bayer color pattern;

when the zoom level is a second zoom level, remosaicing the first image data to generate the output image frame at the second zoom level; and when the zoom level is a third zoom level, binning the first image data to generate the output image frame at the third zoom level.

11. The device of claim 10, wherein the first zoom level, the second zoom level, and the third zoom level correspond to sequential integer zoom levels.

12. The device of claim 10, wherein transforming the first image data to form second image data comprises determining a first plurality of values in the second color pattern based on a second plurality of values in a corresponding first color pattern by weighting each of the second plurality of values based on an intensity of one of the second plurality of values and a distance of the one of the second plurality of values to a corresponding one of the first plurality of values.

13. The device of claim 10, wherein a ratio of N to M is non-integer.

14. The device of claim 10, wherein determining the second image data comprises determining second image data organized in a second color pattern having a 2-by-2 size corresponding to a quadra color filter array (QCFA) pattern.

15. The device of claim 10, further comprising an image sensor coupled to the processor, wherein the processor is configured to receive the first image data from the image sensor.

16. The device of claim 15, further comprising a display coupled to the processor, wherein the processor is configured to present the output image frame on the display.

17. The device of claim 10, wherein transforming the first image data to form second image data comprises sequentially transforming the first color pattern into smaller color patterns by:
  transforming the first image data having an N×N size to an intermediate image data having a L×L size, wherein L is an integer value smaller than N; and
  transforming the intermediate image data having an L×L size to the second image data having a M×M size, wherein M is an integer value smaller than L.

18. A device, comprising:
an image sensor comprising:
  a memory configured to store first image data comprising intensity values as a first representation of a scene organized in a first color filter array (CFA) having an N by N size, wherein N is an integer;
  a transformer coupled to the memory for transforming the first image data to form second image data comprising a second representation of the scene organized in a second color pattern having an M by M size, wherein M is an integer smaller than N and greater than one; and
  a remosaic block coupled to the transformer for remosaicing the second image data to generate an output image frame comprising a third representation of the scene organized in a Bayer color pattern,
  wherein the transformer and the remosaic block are configured to generate the output image frame at a first zoom level,
  wherein the remosaic block is coupled to the memory and further configured to generate the output image frame at a second zoom level, and
  the device further comprising a binning block coupled to the memory for binning the first image data to generate the output image frame at a third zoom level.

19. The device of claim 18, wherein the first zoom level, the second zoom level, and the third zoom level correspond to sequential integer in-sensor zoom levels.

20. The device of claim 18, wherein the transformer is configured to determine a first plurality of values in the second color pattern based on a second plurality of values in a corresponding first color pattern by weighting each of the second plurality of values based on an intensity of one of the second plurality of values and a distance of the one of the second plurality of values to a corresponding one of the first plurality of values.

21. The device of claim 18, wherein a ratio of N to M is non-integer.

22. A non-transitory computer-readable medium storing instructions that, when executed by a processor of a device, cause the device to perform operations comprising:
  receiving first image data captured at a zoom level, the first image data comprising a first representation of a scene organized in a first color pattern having an N by N size, wherein N is an integer;
  when the zoom level is a first zoom level:
    transforming the first image data to form second image data comprising a second representation of the scene organized in a second color pattern having an M by M size, wherein M is an integer smaller than N and greater than one; and
    remosaicing the second image data to generate an output image frame comprising a third representation of the scene organized in a Bayer color pattern;
  when the zoom level is a second zoom level, remosaicing the first image data to generate the output image frame at the second zoom level; and
  when the zoom level is a third zoom level, binning the first image data to generate the output image frame at the third zoom level.

23. The non-transitory computer-readable medium of claim 22, wherein transforming the first image data to form second image data comprises determining a first plurality of values in the second color pattern based on a second plurality of values in a corresponding first color pattern by weighting each of the second plurality of values on an intensity of one of the second plurality of values and a distance of the one of the second plurality of values to a corresponding one of the first plurality of values.

24. The non-transitory computer-readable medium of claim 22, wherein a ratio of N to M is non-integer.

25. The non-transitory computer-readable medium of claim 22, wherein determining the second image data comprises determining second image data organized in a second color pattern having a 2-by-2 size corresponding to a quadra color filter array (QCFA) pattern.

26. The non-transitory computer-readable medium of claim 22, wherein transforming the first image data to form second image data comprises sequentially transforming the first color pattern into smaller color patterns by:

transforming the first image data having an N×N size to an intermediate image data having a L×L size, wherein L is an integer value smaller than N; and transforming the intermediate image data having an L×L size to the second image data having a M×M size, wherein M is an integer value smaller than L.

\* \* \* \* \*